(12) United States Patent
Hegna et al.

(10) Patent No.: US 10,502,851 B2
(45) Date of Patent: Dec. 10, 2019

(54) METHOD FOR OPTIMIZING THE DESIGN OF MULTIPLE-SOURCE ARRAYS USED IN MARINE SEISMIC SURVEYS

(71) Applicant: PGS Geophysical AS, Lysaker (NO)

(72) Inventors: Stian Hegna, Hovik (NO); Gregg Parkes, Corsham (GB); Fabien Julliard, Oslo (NO)

(73) Assignee: PGS Geophysical AS, Oslo (NO)

( * ) Notice: Subject to any disclaimer, the term of this patent is extended or adjusted under 35 U.S.C. 154(b) by 609 days.

(21) Appl. No.: 13/915,504

(22) Filed: Jun. 11, 2013

(65) Prior Publication Data

US 2014/0269170 A1      Sep. 18, 2014

Related U.S. Application Data

(60) Provisional application No. 61/779,199, filed on Mar. 13, 2013.

(51) Int. Cl.
*G01V 1/38*      (2006.01)

(52) U.S. Cl.
CPC ............................. *G01V 1/3808* (2013.01)

(58) Field of Classification Search
USPC .......................................................... 367/15
See application file for complete search history.

(56) References Cited

U.S. PATENT DOCUMENTS

| 6,906,981 B2 | 6/2005 | Vaage |
| 7,450,467 B2 | 11/2008 | Tveide et al. |
| 7,916,576 B2 * | 3/2011 | Beasley et al. ................. 367/38 |
| 2004/0008577 A1 * | 1/2004 | Moldveanu ....................... 367/4 |
| 2010/0014381 A1 * | 1/2010 | Beasley et al. ................. 367/16 |
| 2010/0271904 A1 * | 10/2010 | Moore et al. .................... 367/73 |
| 2011/0299360 A1 * | 12/2011 | Lansley et al. ................. 367/20 |

FOREIGN PATENT DOCUMENTS

| GB | 2183834 | 6/1987 |
| WO | 2004/017097 | 2/2004 |
| WO | 2009/077762 | 6/2009 |

OTHER PUBLICATIONS

Dragoset, Bill. "Introduction to air guns and air-gun arrays." The Leading Edge 19.8 (2000): 892-897.*
Moldoveanu, Nick, et al. "Over/under towed-streamer acquisition: A method to extend seismic bandwidth to both higher and lower frequencies." The Leading Edge 26.1 (2007): 41-58.*

(Continued)

*Primary Examiner* — Isam A Alsomiri
*Assistant Examiner* — Jonathan D Armstrong

(57) ABSTRACT

A method and apparatus for determining marine seismic source configurations which produce a minimum error after the process of combining the wave fields to eliminate the responses of sources including the source ghost operated at multiple depths, without separating these wave fields, is disclosed. In one embodiment, a method includes simulating, on a computer system, the performing of a seismic survey for one or more source configurations. An error term is calculated for each configuration simulated. Based on the calculated error terms, a configuration having the smallest error among those simulated may be determined.

26 Claims, 7 Drawing Sheets

(56) References Cited

OTHER PUBLICATIONS

Womack, J. E., et al. "Encoding techniques for multiple source point seismic data acquisition." Geophysics 55.10 (1990): 1389-1396.*
Parkes, Gregg, and Stian Hegna. "An acquisition system that extracts the earth response from seismic data." First Break 29.12 (2011).*
Halliday, David F. "Source-side deghosting: A comparison of approaches." 2013 SEG Annual Meeting. Society of Exploration Geophysicists, 2013.*
J. E. Womack, et al., "Encoding techniques for multiple source point seismic data acquisition," Geophysics, vol. 55, No. 10, Oct. 1990, pp. 1389-1396, 15 FIGS.
Craig J. Beasley, "A new look at marine simultaneous sources," Special Section: Seismic acquisition, The Leading Edge, Jul. 2008, pp. 914-917.
B. J. Posthumus, "Deghosting Using a Twin Streamer Configuration," Geophysical Prospecting 41, 1993, pp. 267-286.
Examination Report No. 1 in Australian Application No. 2014201392 dated Aug. 28, 2017, 4 pages.
Search Report in GB Appl. No. 1404199.0 dated Jul. 3, 2014, 3 pages.
Gregg Parkes, et al.,"A marine seismic acquisition system that provides a full 'ghost-free' solution," SEG San Antonio 2011 Annual Meeting, pp. 37-41.
Examination Report in GB Appl. No. 1404199.0 dated Aug. 7, 2019, 4 pages.

* cited by examiner

METHOD FOR OPTIMIZING THE DESIGN OF MULTIPLE-SOURCE ARRAYS USED IN MARINE SEISMIC SURVEYS

This application claims the benefit of U.S. Provisional Application No. 61/779,199, filed on Mar. 13, 2013, which is incorporated by reference herein in its entirety.

BACKGROUND

Marine seismic surveys utilize acoustic waves transmitted to the earth's crust and reflected back to recording sensors. The recording sensors may be hydrophones and/or geophones in one of a number of streamers that may be towed behind a survey boat. The survey boat may tow an array of multiple streamers in parallel. Multiple sources for transmitting acoustic waves may also be used in marine seismic surveys.

Various types of sources may be used for conducting marine seismic surveys. One type of source is an air gun, or an array of air guns. During seismic surveys using air guns, an air gun may fire high-pressure air into the water, creating a bubble. The bubble may initially expand. As the bubble expands, the air pressure within the bubble decreases. When the air pressure within the bubble falls below the hydrostatic pressure from the surrounding water, the air bubble will then collapse. As the bubble collapses, the air pressure therein increases, causing the bubble to eventually expand again. Thus, the bubble will oscillate at an oscillation period that depends on the initial air pressure of the bubble, the volume of air released from the air gun, and the hydrostatic pressure of the surrounding water. The oscillation of the bubble further results in acoustic waves transmitted to the water to the bottom of the sea. The acoustic waves may in part penetrate the sea bottom. The acoustic waves may be reflected back by subterranean interfaces upward where they may be detected by hydrophones and geophones. Data produced from detected waves may reveal formations in the Earth's crust below the sea bottom.

The seismic energy source is actuated at a selected depth in the water. About half of the energy travels downwards where it passes through the water bottom and into the rock formations. The remainder of the acoustic energy travels upwards from the air gun or air gun array, and most of this energy reflects from the water surface whereupon it is 180-degree phase shifted and thereafter travels downwards. The reflected energy from the water surface will be delayed in time and phase shifted relative to the directly downward propagating acoustic energy. The surface-reflected, downwardly traveling acoustic energy is commonly known as a "ghost" signal. The ghost signal interferes with the directly downward propagating wave-field causing constructive interference in some parts of the frequency band and destructive interference in other parts of the frequency band. This causes a sequence of notches in the spectrum, approximately equally spaced in frequency, including a notch at zero frequency (0 Hz). The frequencies of these notches in the detected seismic signal are related to the depth at which the air gun or air gun array is disposed, as is well known in the art. The effect of the reflected energy from the sea surface is typically referred to as the "source ghost".

To avoid deep notches in the spectrum and reduce the effects caused by the source ghost, seismic surveys such as those described above may be conducted with multiple sources positioned at different depths. Various techniques for conducting seismic surveys using multiple sources have been developed. Such techniques may rely on different configurations having multiple sources positioned at different depths.

BRIEF DESCRIPTION OF THE DRAWINGS

Other aspects of the disclosure will become apparent upon reading the following detailed description and upon reference to the accompanying drawings which are now described as follows.

Figure 1:
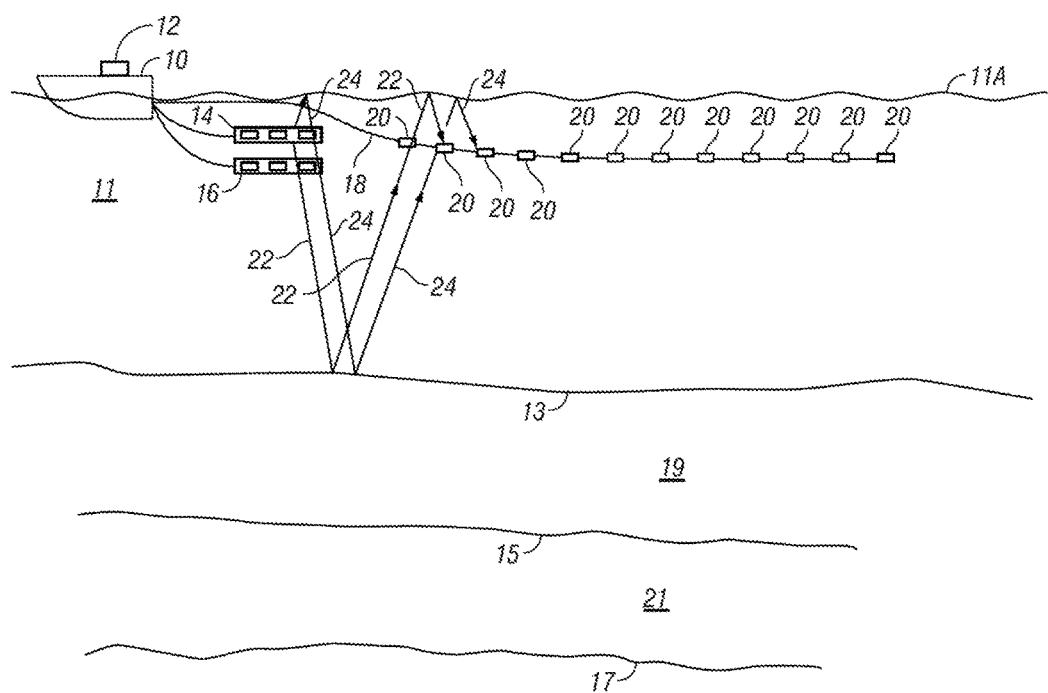
FIG. 1 is a diagram illustrating the conducting of a marine seismic survey using multiple sources.

While the subject matter disclosed herein is susceptible to various modifications and alternative forms, specific embodiments thereof are shown by way of example in the drawings and will herein be described in detail. It should be understood, however, that the drawings and description thereto are not intended to be limiting to the particular form disclosed, but, on the contrary, is to cover all modifications, equivalents, and alternatives falling within the spirit and scope of the present disclosure as defined by the appended claims.

DETAILED DESCRIPTION

FIG. 1 illustrates, in cross sectional view, one embodiment of an arrangement for acquiring seismic data. It is noted that this embodiment is exemplary, and many other embodiments are possible and contemplated. In the embodiment shown, a seismic survey vessel 10 moves along the surface 11A of a body of water 11 such as a lake or ocean. The vessel 10 typically includes equipment shown generally at 12 and referred to for convenience as a "recording system." The recording system 12 may include devices (not shown here) for selectively actuating seismic energy sources 14 and 16 (explained below), for recording the signals generated by sensors or receivers 20 (also explained below) in response to seismic energy projected into the water 11 by seismic energy sources 14 and 16 and thereby into rock formations 19 and 21 below the sea floor 13, and for determining geodetic position of the vessel 10, the seismic energy sources 14 and 16, and each of a plurality of seismic sensors or receivers 20 at any time.

The vessel 10 is shown towing two seismic energy sources 14 and 16. The seismic energy sources 14 and 16 can be any type of marine energy source including but not limited to air guns, water guns, marine vibrators, or arrays of such energy sources. The wave-field emitted by a source array consisting of m source elements is expressed in Equation 1.

$$S_n(k_x, k_y, \omega) = \sum_{l}^{m} P_l(\omega) e^{-ik_x x_l} e^{-ik_y y_l} \quad \text{(Equation 1)}$$

In Equation 1, $S_n(\omega,k_x,k_y)$ represents the wave-field emitted by source array n as a function of $k_x$, the angular wave-number in the horizontal direction in line with the direction of motion of the survey vessel 10, $k_y$, the angular wave-number in the horizontal direction perpendicular to the direction of motion of the survey vessel 10, and $\omega$, the angular frequency. The constant e is known as Euler's number (i.e. 2.71828 . . . ). $P_l(\omega)$ represent the wavefield emitted by source element l where each source element is considered to be a point source. The lateral position of source element l is $(x_l, y_l)$.

In the example shown in FIG. 1, sources 14 and 16 are towed at substantially the same distance behind the vessel 10 and at different depths (with respect to one another) in the water 11. Such arrangement of the sources is referred to as "over/under." In other examples, the sources 14 and 16 may be towed by different vessels (not shown), or may be in a fixed position (provided that the depths are different as shown in FIG. 1). Therefore, having the survey vessel 10 tow sources 14 and 16 is not a limit on the scope of the disclosure. In general, a wide variety of seismic source configurations are possible and contemplated.

The vessel 10 is also shown towing a seismic streamer 18 having a plurality of longitudinally spaced apart seismic receivers 20 thereon. However, this disclosure is generally directed to the seismic energy sources, and therefore may be used together with any type of towed seismic streamer in any configuration, ocean bottom cable, sensors deployed in boreholes etc., and with any type of receiving sensor including but not limited to pressure sensors, pressure time gradient sensors, velocity sensors, accelerometers etc., or any combination thereof.

During operation of the acquisition system shown in FIG. 1, at a selected time the recording system 12 actuates a first one of the seismic energy sources, e.g., source 14. The selected time may be indexed with respect to the start of recording of receiver responses or any other time reference related to signal recording time, and typically has a first selected delay from the start of recording. Energy from the first source 14 travels outwardly therefrom as shown at 24. Some of the energy travels downwardly where it is reflected at acoustic impedance boundaries, e.g., the water bottom 13 and at the boundaries 15, 17 between different rock formations 19, 21. Only the water bottom reflections are shown in FIG. 1 for clarity of the illustration. Up-going portions of the energy from the first source 14 are reflected from the water surface 11A as shown in FIG. 1. Equation 2 is the mathematical expression of the superposition of the wave-field propagating downwardly from the source and the wave-field propagating upwards that is reflected down again from the sea surface $G_n(k_x,k_y,\omega)$. This mathematical expression thereof may be referred to as a ghost function.

$$G_n(k_x,k_y,\omega) = 1 + re^{-ik_z 2 z_n} \quad \text{(Equation 2)}$$

In Equation 2, r represents the reflection coefficient of the sea surface, which is close to and often assumed to be −1. The term $z_n$ is the depth of source n, and $k_z$ can be expressed as in Equation 3.

$$k_z = \sqrt{(\omega/c)^2 - k_x^2 - k_y^2} \quad \text{(Equation 3)}$$

In Equation 3, c represents the propagation velocity of acoustic waves (sound) in water. The recording system 12 is configured to actuate the second seismic energy source, e.g., source 16, at the end of a second time relative to the start of the seismic data recording, or, alternatively, after a selected time before or after the actuation of the first source 14. Energy travelling outwardly from the second source 16 moves along similar paths as the energy from the first source 14 as shown at 22 in FIG. 1. In the present disclosure, the above-described time delays may be selected so that energy from both sources is detected by the receivers 20 in each data recording (called a shot record). It is expected that the time of actuating the sources at different depths may vary between shot records in a random, pseudo-random, or systematic manner.

Figure 2:
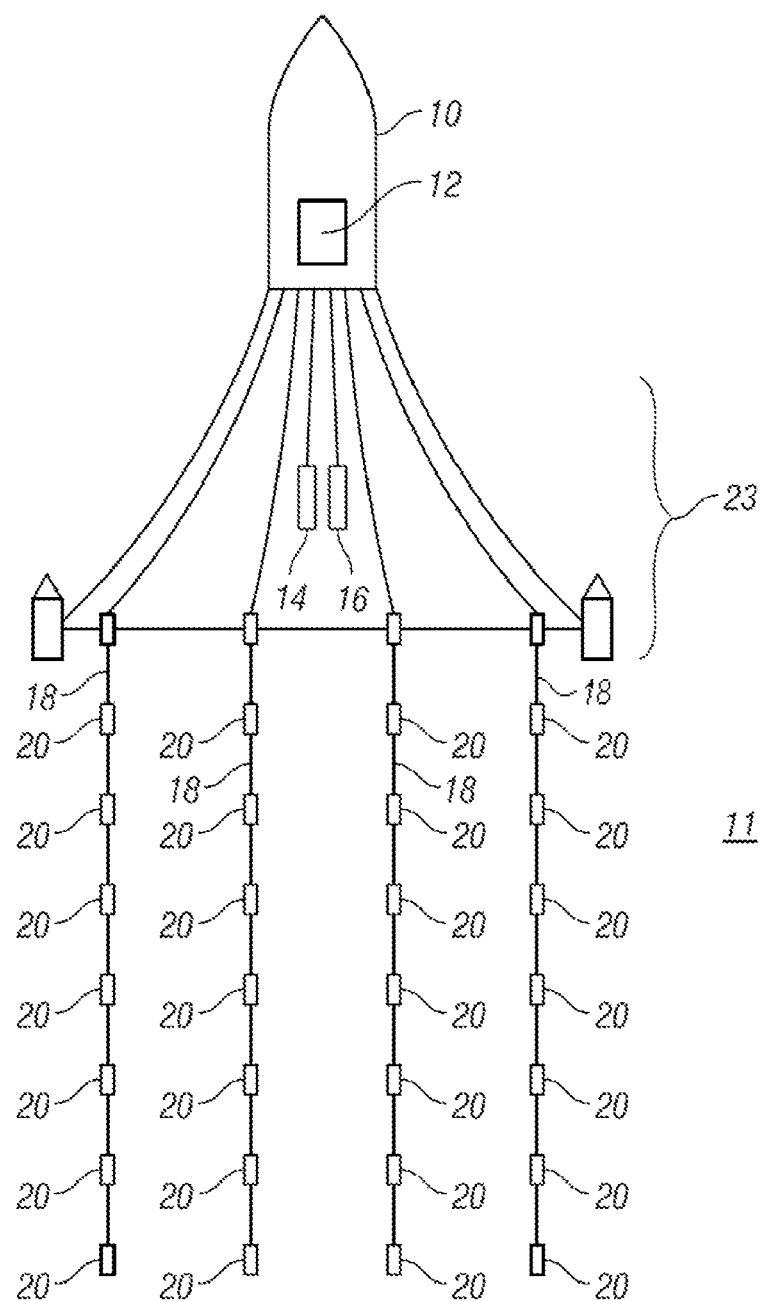
FIG. 2 is a plan view of one embodiment of a configuration for acquiring seismic data illustrating an arrangement of seismic sources and receivers.

FIG. 2 illustrates the arrangement of FIG. 1 in plan view to illustrate towing a plurality of laterally spaced apart streamers 18. The streamers 18 in the embodiment shown can be maintained in their relative lateral and longitudinal positions with respect to the vessel 10 using towing equipment 23 of types well known in the art. What is also shown in FIG. 2 is that the first source 14 and the second source 16 in the illustrated embodiment may be laterally displaced (and/or longitudinally displaced in other examples) to avoid having dispersed air in the water 11 from first source 14 affect the upwardly traveling seismic energy from the second source 16 and vice versa. Lateral and/or longitudinal displacement is contemplated for one embodiment as being only a few meters so that sources 14 and 16 provide energy equivalent to being that which would occur if sources 14 and 16 were in the same vertical plane and at the same longitudinal distance behind the vessel, or expressed differently, at essentially the same geodetic position. By avoiding having dispersed air above the sources when actuated, the effects of the water surface (11A in FIG. 1) on the energy emitted from each source will be, adjusted for water depth, substantially the same as the effect thereof on the other source (14 in FIG. 1).

The source actuation and signal recording explained above may be repeated a number of times while the vessel 10, sources 14 and 16, and streamers 18 move through the water 11. As explained above, each shot record will include, for each receiver 20, signals corresponding to the seismic energy produced by both the first source 14 and the second source 16.

FIGS. 1 and 2 illustrate two sources each operating at a different depth. This is only for illustration purposes. However, the scope of the disclosure is not limited to two sources operating at different depths, but can include any number of sources operating at multiple depths. In addition, the lateral displacements from one source to the next may also be different from what is shown in FIG. 2.

Since the effects of "ghosting" are undesirable, various embodiments of a method have been developed to remove the ghost response by operating two or more sources at different depths.

Equation 4 below expresses a methodology for removing the effects of ghosting for a two-source configuration.

$$W(k_x, k_y, \omega) = \frac{O_1\overline{G_1} + O_2\overline{G_2}}{G_1\overline{G_1} + G_2\overline{G_2}} \quad \text{(Equation 4)}$$

In Equation 4, $W(k_x,k_y,\omega)$ represents de-ghosted data. $O_1$ and $O_2$ represent independent data acquired based on the first and second sources, respectively, as a function of $k_x$, $k_y$, and $\omega$. $G_1$ and $G_2$ represent the ghost function resulting from the first and second sources, respectively as expressed in Equation 2, while the over-bar terms of $G_1$ and $G_2$ represent their respective complex conjugates.

As previously noted, a configuration using multiple sources may place these sources at different depths with respect to one another. Furthermore, the sources in a multi-source configuration have different parameters. Thus, due to the different depths and different source types, the period of oscillation for the bubbles produced by each source (e.g. the sources are air guns) may be different. These differences may thus be accounted for in Equation 5, which is an expansion of Equation 4.

$$W(k_x, k_y, \omega) = \frac{O_1\overline{S_1 G_1} + O_2\overline{S_2 G_2}}{S_1 G_1 \overline{S_1 G_1} + S_2 G_2 \overline{S_2 G_2}} \quad \text{(Equation 5)}$$

In Equation 5, $S_1$ and $S_2$ represent the ghosting-free responses or wave-fields emitted from the sources such as arrays of air guns at multiple depths, as expressed in Equation 1. The over-bar terms of $S_1$ and $S_2$ represent their respective complex conjugates. $O_1$ and $O_2$ may be expressed in terms of W, as follows:

$$O_1(k_x,k_y,\omega)=S_1 G_1 W \quad O_2(k_x,k_y,\omega)=S_2 G_2 W \quad \text{(Equation 6)}$$

The resulting data W in the various expressions above will have both effects of the ghosting and the source wavefields deconvolved.

As noted above, it is desirable to have sources at multiple depths in conducting the marine seismic surveys discussed herein. Ideally the wave-fields associated with the individual sources at multiple depths should be recorded separately. This would reduce the efficiency of the seismic acquisition. Therefore, it is desirable to operate the sources at different depths in such a way that the wave-fields associated with the sources operated at each depth can be separated, and then recombined to remove the effects of the source ghost. The sources may thus be designed in such a way that such wave-fields can be separated as accurately as possible, and such that the errors associated with imperfect separation are as small as possible.

One way of operating the sources at multiple depths that enables separating the wave-fields associated with each source is to actuate the sources with individual time delays that vary from shot to shot in a random, pseudo-random or systematic fashion. It is possible to correct for fire time delays associated with a first source at a given depth such that a wavefield associated with that depth is coherent from one firing to the next. Relative to a wavefield produced by a second source, the wavefield associated therewith will appear incoherent from shot record to shot record. Therefore, the wave-fields associated from each source at the different depths can be separated to a large extent by utilizing the known time delays. However, this method may have residual errors. An alternative method is to design the sources such that the errors associated with combining the wave-fields without separating those associated with each source operated at different depths are minimized.

Equation 6 described the wave-fields associated with each source operated at two different depths individually. If these sources are operated with different fire time delays $\Delta t1$ and $\Delta t2$, the total wave-field recorded can be expressed as:

$$O=(e^{-i\omega\Delta t1}S_1 G_1+e^{-i\omega\Delta t2}S_2 G_2)W \quad \text{(Equation 7)}$$

Using Equation 7, the wavefields for the first and second sources to be used in Equation 5 above without separating the wave-fields associated with the sources can be expressed as Equation 8 below.

$$O'_1=(S_1 G_1+e^{-\omega(\Delta t2-\Delta t1)}S_2 G_2)W$$

$$O'_2=(S_2 G_2+e^{-\omega(\Delta t1-\Delta t2)}S_1 G_1)W \quad \text{(Equation 8)}$$

Inserting the two expressions of Equation 8 into Equation 5 results in Equation 9:

$$\frac{(S_1 G_1 + e^{-i\omega(\Delta t2-\Delta t1)}S_2 G_2)W\overline{S_1 G_1} + (S_2 G_2 + e^{-i\omega(\Delta t2-\Delta t1)}S_1 G_1)W\overline{S_2 G_2}}{S_1 G_1 \overline{S_1 G_1} + S_2 G_2 \overline{S_2 G_2}} = W\left(1 + \frac{e^{-i\omega(\Delta t2-\Delta t1)}S_2 G_2\overline{S_1 G_1} + e^{-i\omega(\Delta t1-\Delta t2)}S_1 G_1\overline{S_2 G_2}}{S_1 G_1\overline{S_1 G_1} + S_2 G_2\overline{S_2 G_2}}\right) \quad \text{(Equation 9)}$$

In Equation 9, the expression multiplied by W is the error term, which is expressed below as Equation 10.

$$\varepsilon = \frac{e^{-i\omega(\Delta t2-\Delta t1)}S_2 G_2\overline{S_1 G_1} + e^{-i\omega(\Delta t1-\Delta t2)}S_1 G_1\overline{S_2 G_2}}{S_1 G_1\overline{S_1 G_1} + S_2 G_2\overline{S_2 G_2}} \quad \text{(Equation 10)}$$

The methodology discussed herein is directed to reducing the value of the error as expressed by Equation 10. More particularly, the error as expressed by Equation 10 is based on the terms S1, S2, G1, and G2, and thus reducing the error may be based on finding a particular combination of these terms. If the error as determined in Equation 10 is reduced to zero, there is no need to separate the wave-fields associated with each source before de-ghosting the data using Equation 5.

The numerator of Equation 10 as shown above represents the cross correlation between the source wavefields and ghost functions for S1 and S2. This is due to the fact that multiplication of complex conjugates in the frequency domain is equivalent to cross correlation in the time domain. Thus, the terms $S_2 G_2\overline{S_1 G_1}$ and $S_1 G_1\overline{S_2 G_2}$ represent the cross-correlation between the first and the second source wavefields including the ghost functions.

The terms $e^{-i\omega(\Delta t1-\Delta t2)}$ and $e^{-i\omega(\Delta t2-\Delta t1)}$ represent the time shifts related to the difference in fire time delays between the first and the second sources. These time shifts may be symmetrical around zero, with one time shift being negative and the other time shift being positive. The error function may thus be thought of as side-lobes in a wavelet that is symmetrical around time zero.

It is noted that while the derivation of the error function outlined above has been for a two-source configuration, the methodology discussed herein is not limited to such configurations. Each of the expressions above may be expanded for any desired number of sources and corresponding configurations.

Figure 3:
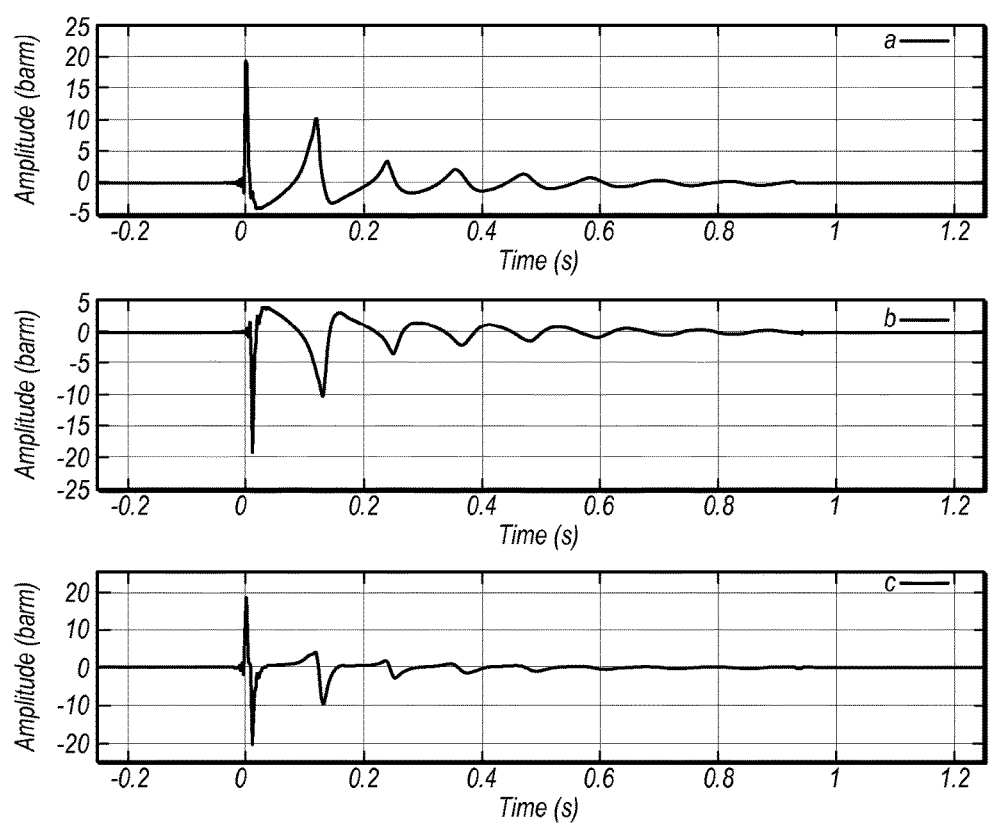
FIG. 3 is a diagram illustrating (a) an emitted wavelet from one embodiment an air gun source in the vertical downward direction, (b) the equivalent wavelet for the part of the wavefield travelling upwards from the source in the vertical direction that is reflected downwards with a 180 degree phase shift, and (c) the composite wavelet, which is a summation of (a) and (b).

FIG. 3 is an illustration of the part of the wave field emitted by one embodiment of an air gun source in the vertical direction. The upper curve shows the part of the wave field propagating downwards and vertically, the middle curve shows the part of the wave field propagating upwards and vertically that is reflected down from at the sea surface with a 180 degree phase shift, whereas the bottom curve shows the composite of the two, which is the sum of (a) and (b).

Figure 4:
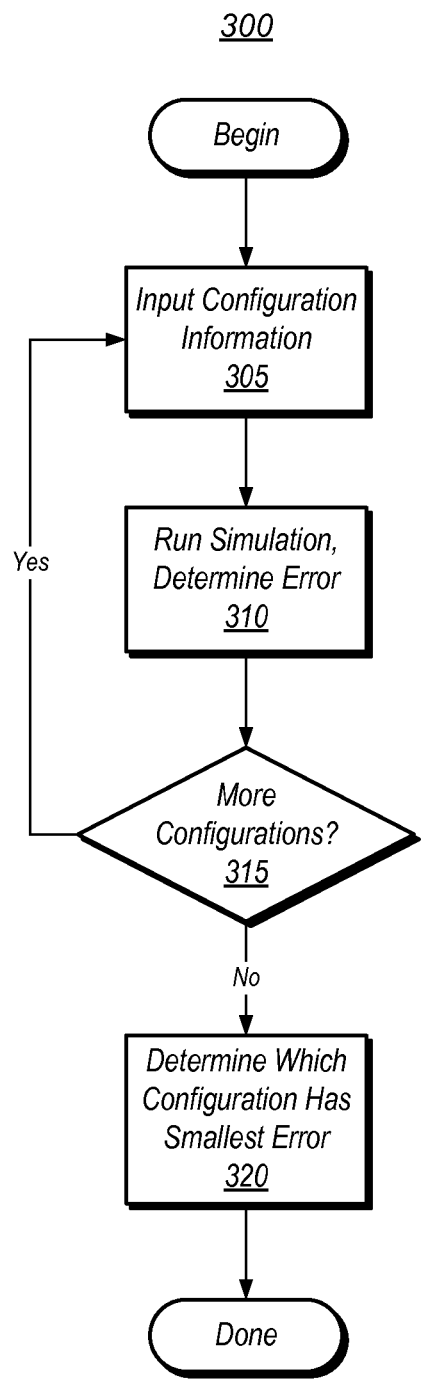
FIG. 4 is a flow diagram illustrating one embodiment of a method for predicting a minimum error in the de-ghosting process for a number of different seismic source configurations.

FIG. 4 is a flow diagram illustrating one embodiment of a method for predicting the source configurations that will give minimum error when combining wave fields from multiple sources operated at different depths. The methodology performed in FIG. 4 may be based on the variations of the equations discussed above in accordance with the number and types of available sources and source configurations.

Method 300 begins with the inputting of configuration information for a seismic survey configuration to be simulated (block 305). The configuration may include a number of different seismic sources. A given one of the sources may be suspended at a depth that is different with respect to at least one of the other sources. After the data has been input, a computer system may perform a simulation of the response using the selected configuration (block 310), including a determination of the error in accordance with a variation of Equation 10 that corresponds to the simulated configuration. If more configurations are to be simulated (block 315, yes), then block 305 and 315 may be repeated as many times as desired. If no more configurations are to be simulated (block 315, no), then the configuration that had the smallest error among all simulated configurations may be determined (block 320).

Figure 5:
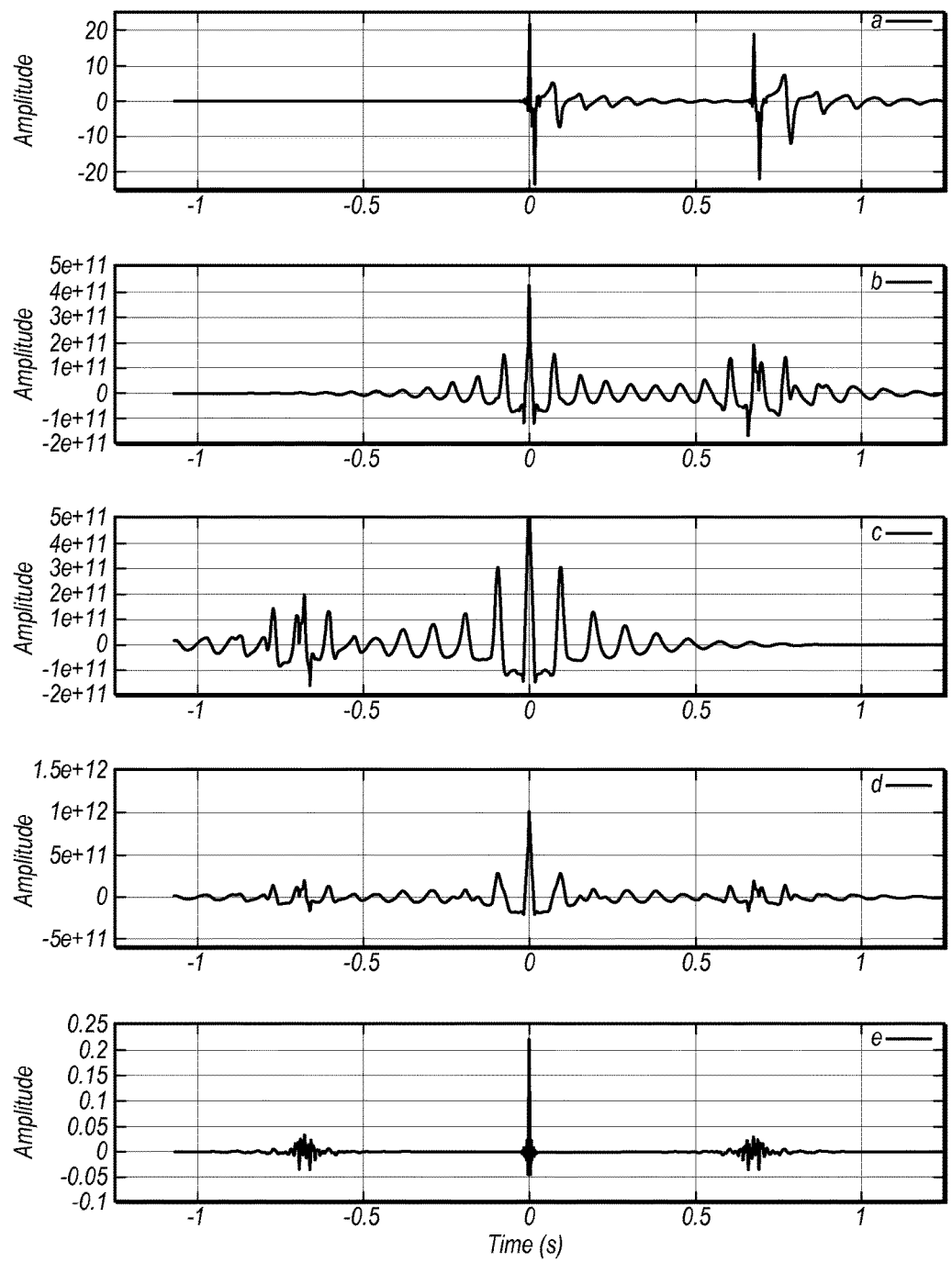
FIG. 5 is a diagram illustrating, for one embodiment of a seismic source configuration, the ghost removal process in terms of the various steps, and the resulting responses in the seismic dataset including the error terms.

The process described by Equation 9 may be illustrated graphically in FIG. 5. Starting from the top, the first plot shows the part of the emitted wavefield in the vertical direction from sources operated at two different depths actuated with different time delays, so two distinct emissions can be seen. The second plot is the same part of the wavefield as in the first plot, corrected for the time delay of source 1 and multiplied by the complex conjugate of both $S_1$ and $G_1$, as defined in the discussion above. The third plot is similar to the second, but corrected for the time delay of source 2 and multiplied by the complex conjugate of $S_2$ and $G_2$. The third plot is the sum of the two above, and the fourth plot at the bottom is the result after the denominator in Equation 9 has been applied. The central part of the wavelet around time zero is the desired output, whereas the side lobes occurring at times corresponding to the difference in time delays between source 1 and source two (+/−0.6 seconds in this particular example) are the errors caused by not separating the wave fields associated with each individual source before combining them as described by Equation 10.

Figure 6:
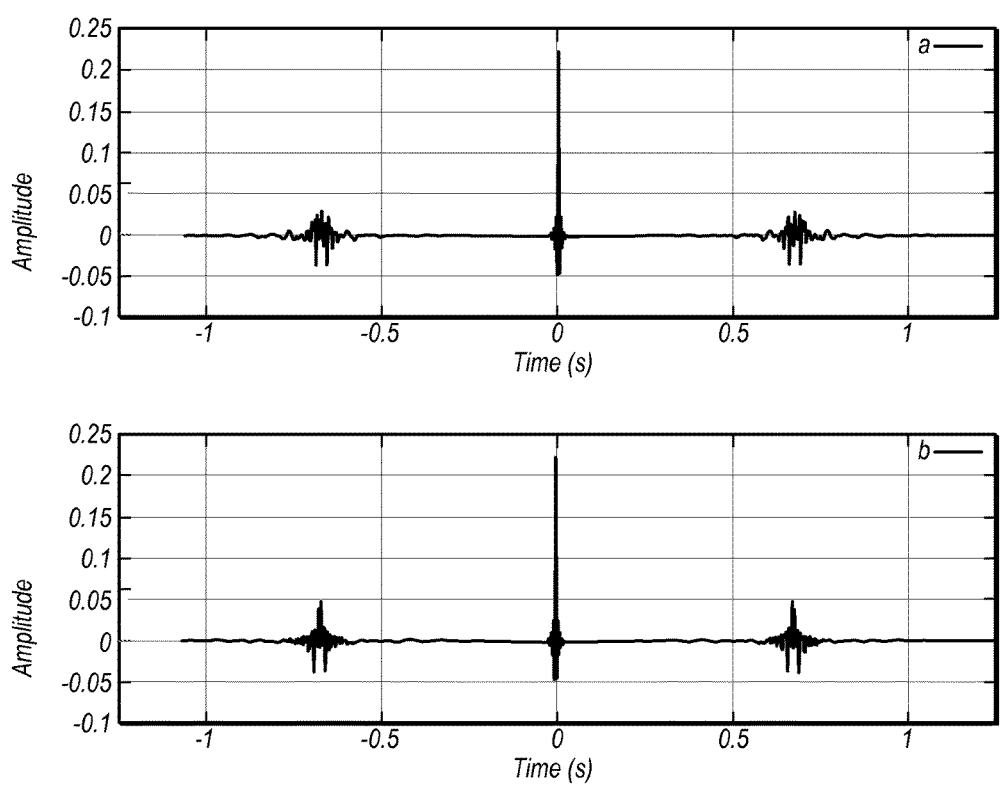
FIG. 6 is a diagram illustrating, for one embodiment of a seismic source configuration, the final responses after the ghost removal process including the error terms for optimized configurations according to this invention (a) and non-optimized source configurations (b).

The upper plot in FIG. 6 is an example of the results after going through the process described in the flow diagram in FIG. 4 for a number of different source configurations. The lower plot is a similar diagram for a selected typical source that has not been optimized to minimize the errors. The peak amplitude of the errors that can be seen as side lobes occurring at approximately +/−0.6 seconds are clearly larger in the lower plot compared to the upper.

Figure 7:
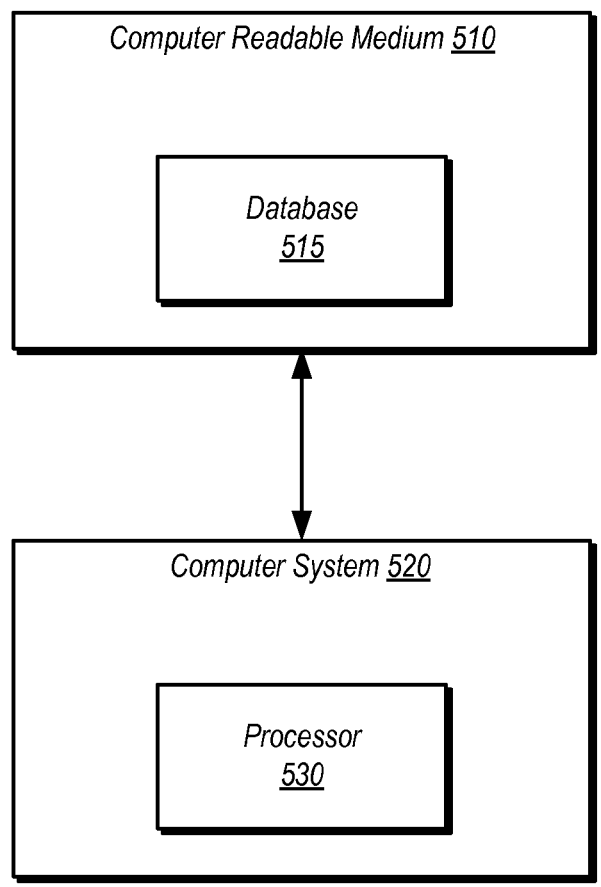
FIG. 7 is a block diagram illustrating one embodiment of a computer system and computer readable medium for performing a method to predict a minimum error in the de-ghosting process for a number of different seismic source configurations.

FIG. 7 is a block diagram illustrating one embodiment of a computer system and computer readable medium for performing a method to predict a minimum error for a number of different seismic survey configurations. In the embodiment shown, computer system 520 includes a processor 530 configured to execute instructions and process data. Computer readable medium 510 includes a database 515 stored thereon that may be used to conduct simulations in accordance with the discussion above. Database 515 may include instructions and data used by computer system 520/processor 530 to conduct the simulations. Moreover, database 515 may be modified by inputs from a user or other source.

Computer readable medium 510 may be any type of non-transitory storage medium. Such media types include hard disk storage, flash memory, random access memory (RAM; static and/or dynamic), and so on. Furthermore, computer readable medium 510 may incorporate more than one type of non-transitory storage media, volatile and/or non-volatile.

Numerous variations and modifications will become apparent to those skilled in the art once the above disclosure is fully appreciated. It is intended that the following claims be interpreted to embrace all such variations and modifications.

What is claimed is:

1. A non-transitory, computer readable medium storing instructions that, when executed by a computer system, cause the computer system to perform operations comprising:
   determining an associated de-ghosting error for a de-ghosting process for each of a plurality of seismic source configurations of a marine seismic survey, wherein the de-ghosting process includes removing effects of surface-reflected, downwardly traveling acoustic waves, wherein the determined de-ghosting errors are indicative of errors in the de-ghosting process caused by interference with waves detected resulting from transmissions from two or more sources, wherein each of the plurality of seismic source configurations includes at least two different source depths, and wherein the de-ghosting errors are determined without performing wave-field separation of wave-fields associated with the sources; and
   selecting, for performance of a marine seismic survey to generate at least one data set with marine seismic equipment, a seismic source configuration having the smallest associated de-ghosting error; and
   storing information indicating the selected seismic source configuration on a non-transitory computer-readable medium.

2. The non-transitory, computer readable medium as recited in claim 1, wherein the determining the associated de-ghosting error includes simulating towing the two or more sources behind a survey vessel at different depths from one another and performing concurrent transmissions from the two or more sources.

3. The non-transitory, computer readable medium as recited in claim 1, wherein the plurality of seismic source configurations includes:
   a first air gun towed behind a survey vessel in water at a first depth, and a second air gun towed behind the survey vessel at a second depth different from the first depth;
   wherein the first air gun is configured to project a first air bubble into the water at a first air pressure, and wherein the second air gun is configured to project a second air bubble into the water at as second air pressure different from the first air pressure.

4. The non-transitory, computer readable medium as recited in claim 3, wherein each of the first and second air guns is configured to project respective air bubbles downward toward a sea bottom.

5. The non-transitory, computer readable medium as recited in claim 3, wherein the first air gun is configured to project into the water a first bubble having a first oscillation period, and wherein the second air gun is configured to project into the water a second air bubble having a second oscillation period, wherein the second oscillation period is different from the first oscillation period.

6. The non-transitory, computer readable medium as recited in claim 1, wherein determining the associated de-ghosting error includes determining an effect of sea surface reflections from transmissions by each of the two or more sources.

7. A method comprising:
determining respective de-ghosting errors for a de-ghosting process associated with ones of a plurality of seismic source configurations of a marine seismic survey, wherein the de-ghosting process includes removing effects of surface-reflected, downwardly traveling acoustic waves;
determining a particular seismic source configuration of the plurality of seismic source configurations that has a smallest associated error out of the determined respective de-ghosting errors, wherein the determined error is indicative of errors in the de-ghosting process caused by interference with waves detected resulting from transmissions from two or more sources, wherein the seismic source configuration includes at least two different source depths, and wherein the errors are determined without performing wave-field separation of wave-fields associated with the two or more sources;
configuring marine seismic survey equipment according to the determined seismic source configuration; and
performing a marine seismic survey with the configured marine seismic survey equipment, the marine seismic survey producing at least one data set.

8. The method as recited in claim 7, wherein each seismic source configuration includes towing, behind a survey vessel in water, a first seismic source towed at a first depth and a second seismic source towed at a second depth different from the first depth.

9. The method as recited in claim 8, wherein the first and second seismic sources are first and second air guns each configured to project a respective air bubble into the water.

10. The method as recited in claim 9, wherein the first air gun is configured to project a first air bubble having a first oscillation period into the water and wherein the second air gun is configured to project a second air bubble having a second oscillation period into the water, wherein the second oscillation period is different from the first oscillation period.

11. The method as recited in claim 9, wherein the first air gun is configured to project an air bubble into the water at a first air pressure value, and wherein the second air gun is configured to project an air bubble into the water at a second air pressure value different from the first air pressure value.

12. The method as recited in claim 9, wherein each of the first and second air guns is configured to project respective air bubbles downward toward a sea bottom.

13. The method as recited in claim 8, wherein determining the seismic source configuration having the smallest associated error includes determining an effect of sea surface reflections from transmissions by each of the two or more sources.

14. A method comprising:
performing a marine seismic survey using a first configuration of seismic sources and determining an associated first de-ghosting error for a de-ghosting process wherein the de-ghosting process includes removing effects of surface-reflected, downwardly traveling acoustic waves;
performing the marine seismic survey using a second configuration of seismic sources and determining an associated second de-ghosting error for the de-ghosting process;
determining which of the first and second de-ghosting errors is smaller, wherein the first and second de-ghosting errors are indicative of errors in the de-ghosting process caused by interference with waves detected resulting from concurrent transmissions from two or more sources in each configuration, wherein each of the first and second configurations includes at least two different source depths, and wherein the first and second de-ghosting errors are determined without performing wave-field separation of wave-fields associated with the first or second configuration of seismic sources; and
performing additional marine seismic surveys using the configuration determined to have the smaller associated de-ghosting error, the additional marine seismic surveys producing at least one data set.

15. The method as recited in claim 14, wherein the first configuration includes a first seismic source towed at a first depth and a second seismic source towed at a second depth different from the first depth.

16. The method as recited in claim 15, wherein the first seismic source is a first air gun, and wherein the second seismic source is a second air gun.

17. The method as recited in claim 16, wherein the first air gun is configured to project into water a first air bubble having a first oscillation period and wherein the second air gun is configured to project into the water a second air bubble having a second oscillation period.

18. The method as recited in claim 17, wherein the second configuration includes a third air gun configured to project into the water a third air bubble having a third oscillation period and a fourth air gun configured to project into the water a fourth air bubble having a fourth oscillation period.

19. The method as recited in claim 18, wherein the first air gun is configured to project the first air bubble into the water at a first air pressure, wherein the second air gun is configured to project the second air bubble into the water at a second air pressure, wherein the third air gun is configured to project the third air bubble into the water at a third air pressure, and wherein the fourth air gun is configured to project the fourth air bubble into the water at a fourth air pressure.

20. The non-transitory, computer readable medium as recited in claim 1, wherein determining the associated de-ghosting error for each of the plurality of seismic source configurations is based in part on firing time delays between transmissions for the two or more sources.

21. A non-transitory, computer readable medium storing instructions that, when executed by a computer system, cause the computer system to:
determine an associated de-ghosting error c for each of a plurality of seismic source configurations of a marine seismic survey, wherein the de-ghosting errors are indicative of interference with waves detected resulting from transmissions from first and second sources, wherein each of the plurality of seismic source configurations includes at least two different source depths, and wherein the de-ghosting errors are determined without performing wave-field separation of wave-fields associated with the first and second sources; and selecting a seismic source configuration having the smallest associated de-ghosting error; wherein the selected seismic source configuration is usable to perform a marine seismic survey with marine seismic equipment to generate at least one data set;

wherein the de-ghosting error c for a particular seismic source configuration is determined as:

$$\varepsilon = \frac{e^{-i\omega(\Delta t2 - \Delta t1)} S_2 G_2 \overline{S_1 G_1} + e^{-i\omega(\Delta t1 - \Delta t2)} S_1 G_1 \overline{S_2 G_2}}{S_1 G_1 \overline{S_1 G_1} + S_2 G_2 \overline{S_2 G_2}},$$

wherein $S_1$ and $S_2$ are representative of the wave-fields emitted by the first and second sources, respectively, $G_1$ and $G_2$ are ghost functions associated with the first and second sources, respectively, $S_2 G_2 \overline{S_1 G_1}$ and $S_1 G_1 \overline{S_2 G_2}$ represent the cross-correlation between the first and the second source wave-fields including the ghost functions, $\Delta t1$ and $\Delta t2$ are firing time delays of the first and second sources, respectively, and $\omega$ is the angular frequency.

22. The non-transitory, computer readable medium of claim 1, wherein the operations further comprise performing the de-ghosting process.

23. The non-transitory, computer readable medium of claim 1, wherein the operations further comprise performing the marine seismic survey using the selected seismic source configuration.

24. The non-transitory, computer readable medium of claim 1, wherein the de-ghosting errors are determined based on cross-correlation between source wavefields and ghost functions for two or more sources and one or more time delays such that the de-ghosting errors are determined without performing wave-field separation of wave-fields associated with the sources.

25. The non-transitory, computer readable medium of claim 24, wherein the one or more time delays include multiple different time delays that are symmetrical around zero.

26. A non-transitory, computer readable medium storing instructions that, when executed by a computer system, cause the computer system to perform operations comprising:

determining an associated de-ghosting error for a de-ghosting process for each of a plurality of seismic source configurations of a marine seismic survey, wherein the determined de-ghosting errors are indicative of errors in the de-ghosting process caused by interference with waves detected resulting from transmissions from two or more sources, wherein each of the plurality of seismic source configurations includes at least two different source depths, and wherein the de-ghosting errors are determined based on:

cross-correlation between source wavefields; and ghost functions for two or more sources and one or more time delays such that the de-ghosting errors are determined without performing wave-field separation of wave-fields associated with the sources; and selecting, for performance of a marine seismic survey to generate at least one data set with marine seismic equipment, a seismic source configuration based on the determined de-ghosting errors.

* * * * *